Aug. 9, 1949.    C. DE LANGE ET AL    2,478,749
COMBINATION OF A BLOCKING LAYER RECTIFIER PLATE
HAVING A COOLING PLATE PRESSED ON IT
Filed April 23, 1946    2 Sheets-Sheet 1

INVENTORS
CORNELIS DE LANGE
DANIEL MARIE DUINKER
BY
ATTORNEY

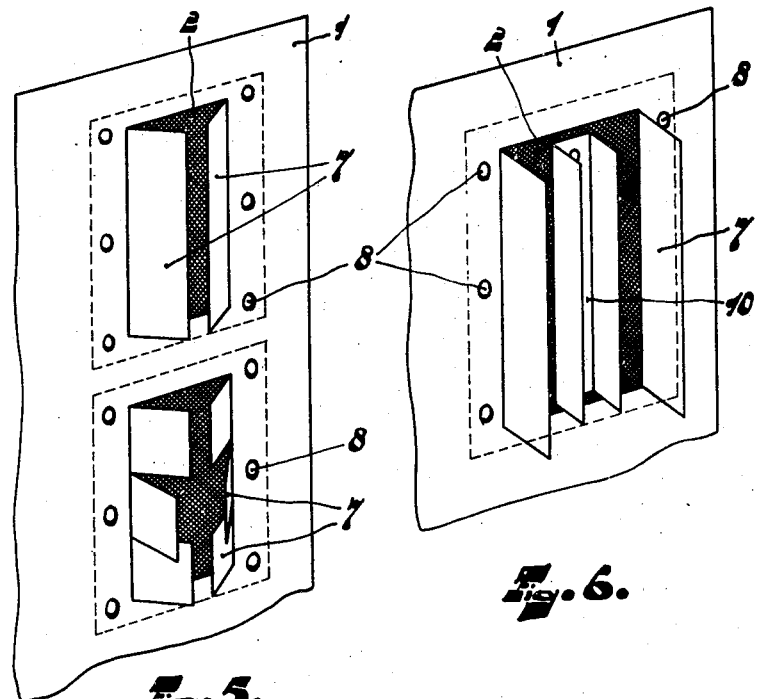
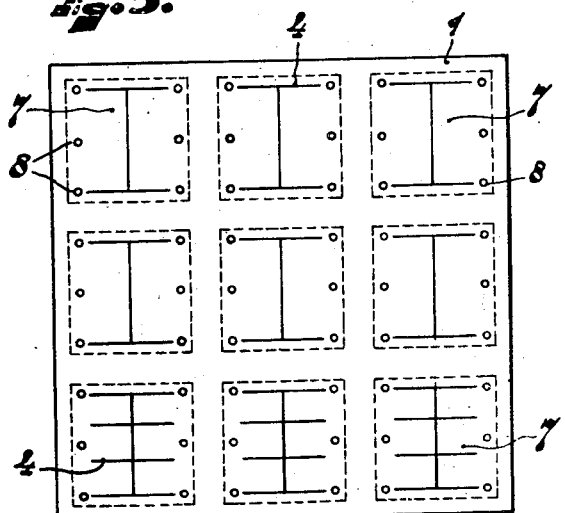

Patented Aug. 9, 1949

2,478,749

UNITED STATES PATENT OFFICE 2,478,749

COMBINATION OF A BLOCKING LAYER RECTIFIER PLATE HAVING A COOLING PLATE PRESSED ON IT

Cornelis de Lange and Daniel Marie Duinker, Eindhoven, Netherlands, assignors, by mesne assignments, to Hartford National Bank and Trust Company, Hartford, Conn., as trustee Application April 23, 1946, Serial No. 664,232
In the Netherlands October 31, 1942

Section 1, Public Law 690, August 8, 1946
Patent expires October 31, 1962

5 Claims. (Cl. 175—366)

1

The power of a blocking layer rectifier is largely limited by the maximum permissible temperature so that the heat produced can be carried off as swiftly as possible. To such end various expedients have already been used. In a very common construction the blocking layer rectifier plate is pressed against a cooling plate whose surface exceeds that of the rectifying plate, an intimate thermal contact being established between the two plates. Consequently the cooling surface grows larger per rectifying plate. This construction suffers from the drawback that the contact surface between the two plates does not contact with the cooling medium.

The present invention relates to a combination of a blocking layer rectifier plate having a cooling plate pressed on it, in which this drawback is cured, thus ensuring a more intensive cooling.

According to the invention the part of the cooling plate covered by the rectifying plate exhibits one or more apertures formed by partly cutting the material of the cooling plate and bending it out of the plane of the latter.

In this way the back of the rectifying plate directly contacts with the cooling medium and in addition the material of the cooling plate is more efficiently utilized, thus achieving a suitable cooling in a small volume.

A suitable method of forming these apertures consists in cutting the material of the cooling plate according to an open figure. The expression open figure is to be understood to mean a figure in which no material is completely bounded by a cutting line, so that no material is cut off or out of the plate. Suitable open figures are those in the form of an H, U, V, Z, or of a star.

Of course, the thermal contact left between the rectifying plate and the cooling plate should be such as to permit an easy exchange of heat between them, but this exchange is reduced only to a very small degree by the apertures, since it largely takes place in the immediate vicinity of the location where the plates are pressed together, consequently within a small circle about the fastening bolt, riveted joint or the like. To permit a suitable transmission of heat to the part of the cooling plate not coated by the rectifying plate the latter, in another form of construction, is pressed against the cooling plate at least at one edge. At this edge a certain number of fastening means may be provided.

When making use of a round rectifying plate with central attachment a ring of apertures is preferably provided about this attachment. In this case, moreover, the edge of the rectifying

2 plate may be pressed against the cooling plate by means of clamping devices. In the latter case the central attachment may be omitted, if desired.

When providing a number of apertures in the cooling plate it is advantageous to bend out the material along parallel lines. In the final mounting in the rectifier care will then be taken to make these lines extend in the direction of flow of the cooling medium, thus hampering this flow as little as possible.

In a suitable form of construction, where the rectifying plate has a rectangular or square shape, it is secured to the cooling plate at two parallel edges. The material of the cooling plate is cut according to an H or I and two wings are bent out of the material along lines extending parallel with and near the edges of the rectifying plate that are secured to the cooling plate.

The invention will now be more fully explained by reference to the accompanying drawings representing, by way of example, several forms of construction thereof.

Figures 5 and 6 are perspective views of a cooling plate to which are secured square rectifying plates, Fig. 7 being an elevation of such a cooling plate having secured to it nine rectifying plates.

Figures 1, 2:
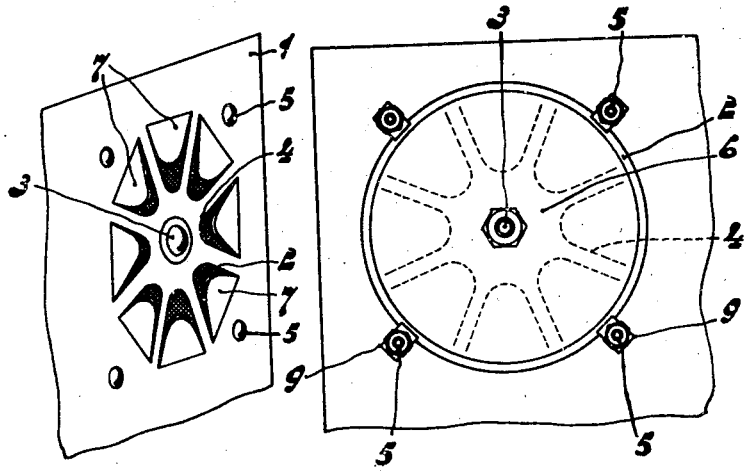
Figures 1, 3 and 4 are perspective views of three combinations of a round blocking layer rectifier plate comprising a cooling plate.
Fig. 2 is an elevation of the combination shown in Fig. 1, viewed from the side of the cooling plate where the rectifying plate is secured.

Fig. 1 represents a cooling plate to which the rectifying plate 2 is clamped by means of a screw bolt 3. This plate is visible solely through the apertures resulting from the U-shaped incisions 4 where the wings 7 are bent out the rectifying plate 2 may consist of a supporting plate carrying in the usual way a semi-conducting and a conducting electrode separated by a blocking layer. The semi-conducting electrode may, for instance, consist of a layer of selenium or cuprous oxide.

In Fig. 2 the combination is viewed from the other side. In this case the incisions are indicated in dotted lines. The conducting electrode, which may consist of a layer of metal applied by spraying, is designated by 6. With this electrode a space is left about the bolt 3 and at the edge of the plate, four clamping plates 9 being fastened by means of screw bolts 5 along the edge.

Figures 3, 4:
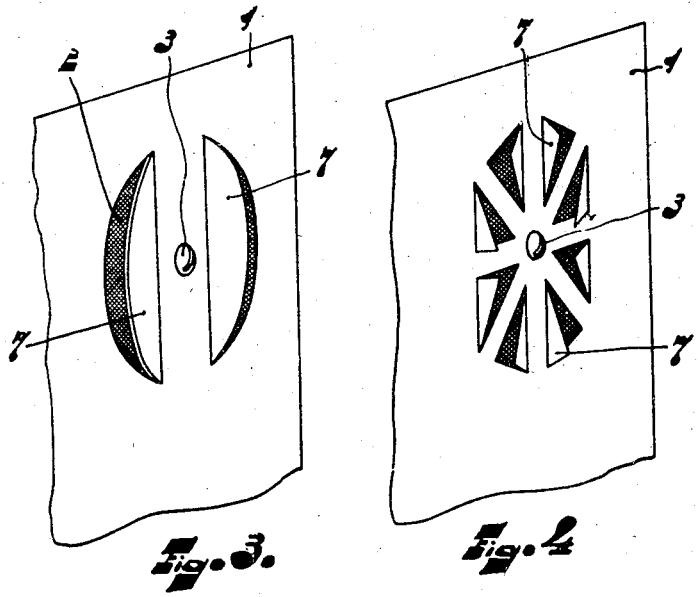

The construction represented in Figures 1 and 2 may be objectionable in regard to the flow of the cooling medium, the drawbacks consisting in that this flow is hampered on account of the diverse directions in which the wings 7 are arranged. The constructions represented in Figures 3 and 4 are better in this respect, since the wings 7 are bent out along parallel lines extending in a vertical direction. Consequently, the wings extend in vertical planes so that the flow of the cooling medium, which has been supposed to take place in a vertical direction, is hampered as little as possible.

In the construction shown in Figures 5 and 6 square rectifying plates are secured in each instance to the cooling plate 1 by means of six rivets 8 that are provided along two parallel edges of the rectifying plate. In this case the material of the cooling plate is provided with an incision in the form of an I or H, thus obtaining two wings 7. The material is bent out along lines extending near the edges of the rectifying plate that are connected to the cooling plate. By these constructions an optimum cooling is ensured near these fastened edges.

The lower half of Figure 5 shows a variation of the construction of the wings, where in each instance a row of wings is bent out along one line but over different angles. In this construction the dissipation of heat is still slightly better than in that where the wings are not divided. Of course this construction may be used in all embodiments of the invention.

Figure 6 represents a construction similar to that shown in Figure 5. In this case, however, the wings 7 are spaced apart and bent out to such an extent as to leave space, for providing a loose cooling plate 10 having a U-shaped section at the back of the rectifying plate.

Figure 7 represents a cooling plate 1 carrying nine rectifying plates. In this construction, also, all wings are bent along parallel lines. However, these lines are not indicated in the drawing, since the wings have not yet been bent out. The lower part of this figure shows the incisions 4 required for the obtainment of wings as represented in the lower half of Figure 5.

It will be obvious that the use of the invention yields an increase in cooling surface corresponding to twice the surface of the aperture, where no material has been cut at all from the cooling plate. Consequently, it also appears that a better cooling ensues even when cutting some material from this plate. When the wings are completely cut off it is also ensured that the cooling medium directly engages the back of the rectifying plate, which has the advantage over the prior construction that the heat produced in the rectifying plate, at least in this direction, need not first flow over the thermal contact between the two plates for gaining access to the cooling medium.

What we claim is:

1. A blocking layer rectifier comprising a rectifying plate, a cooling plate in intimate thermal contact therewith, said cooling plate comprising a plurality of heat radiating wing members constituted by integral projecting portions extending outwardly therefrom, the planes of said projecting portions intersecting the plane of said cooling plate in parallel lines, said projecting portions shaped to fit apertured portions of said cooling plate which are contiguous to said projecting portions.

2. A blocking layer rectifier comprising a rectangular rectifying plate, a cooling plate in intimate thermal contact therewith, clamping means securing said rectifying plate to said cooling plate along two parallel edges thereof, said cooling plate comprising a plurality of heat radiating wing members constituted by integral projecting portions extending outwardly therefrom and cut from the material of said cooling plate, the cut portion of said cooling plate having the shape of an H with two wings bent out of the material along lines extending parallel to the edges of the rectifying plate that are connected to the cooling plate.

3. A blocking layer rectifier, comprising a rectifying plate, a cooling plate in intimate contact therewith, said cooling plate comprising a plurality of heat-radiating wing members constituted by integral projecting portions having the shape of a segment fitting corresponding contiguous apertures in the cooling plate and extending outwardly therefrom, the planes of the segments intersecting the plane of said cooling plate in parallel lines.

4. A blocking layer rectifier, comprising a rectifying plate, a cooling plate in intimate contact therewith, said cooling plate comprising a plurality of heat-radiating wing members constituted by integral triangular shaped projecting portions fitting corresponding contiguous apertures in the cooling plate and extending outwardly therefrom, the planes of the projecting portions intersecting the plane of said cooling plate in parallel lines.

5. A blocking layer rectifier, comprising a rectifying plate, a cooling plate in intimate thermal contact therewith, said cooling plate comprising a plurality of heat-radiating wing members constituted by pairs of integral rectangular shaped projecting portions, each pair fitting a corresponding common aperture in the cooling plate and extending outwardly therefrom, the planes of the projecting portions intersecting the plane of the cooling plate in parallel lines.

CORNELIS DE LANGE.
DANIEL MARIE DUINKER.

REFERENCES CITED

The following references are of record in the file of this patent:

UNITED STATES PATENTS

| Number | Name | Date |
|---|---|---|
| 2,345,038 | De Lange | Mar. 28, 1944 |

FOREIGN PATENTS

| Number | Country | Date |
|---|---|---|
| 525,665 | Germany | June 4, 1931 |